United States Patent
Fu et al.

(10) Patent No.: US 10,482,603 B1
(45) Date of Patent: Nov. 19, 2019

(54) MEDICAL IMAGE SEGMENTATION USING AN INTEGRATED EDGE GUIDANCE MODULE AND OBJECT SEGMENTATION NETWORK

(71) Applicant: Inception Institute of Artificial Intelligence, Ltd., Abu Dhabi (AE)

(72) Inventors: Huazhu Fu, Abu Dhabi (AE); Jianbing Shen, Abu Dhabi (AE); Zhijie Zhang, Abu Dhabi (AE); Hang Dai, Abu Dhabi (AE); Ling Shao, Abu Dhabi (AE)

(73) Assignee: ARTIFICIAL INTELLIGENCE, LTD., Abu Dhabi (AE)

( * ) Notice: Subject to any disclaimer, the term of this patent is extended or adjusted under 35 U.S.C. 154(b) by 0 days.

(21) Appl. No.: 16/451,565

(22) Filed: Jun. 25, 2019

(51) Int. Cl.
| | | |
|---|---|---|
| *G06K 9/34* | (2006.01) |
| *G06K 9/00* | (2006.01) |
| *G06T 7/11* | (2017.01) |
| *G06N 3/04* | (2006.01) |
| *G06F 17/15* | (2006.01) |
| *G06T 7/00* | (2017.01) |

(52) U.S. Cl.
CPC ............... *G06T 7/11* (2017.01); *G06F 17/15* (2013.01); *G06N 3/04* (2013.01); *G06T 7/0012* (2013.01)

(58) Field of Classification Search
CPC . G06T 7/11; G06T 2207/20081; A61B 6/032; A61B 6/52; G01C 21/005
USPC .................................................. 382/173, 103
See application file for complete search history.

(56) References Cited

U.S. PATENT DOCUMENTS

| | | | |
|---|---|---|---|
| 10,248,664 B1 | 4/2019 | Shen et al. | |
| 10,325,373 B2* | 6/2019 | Kwant | ............... G06K 9/4638 |
| 2019/0145784 A1* | 5/2019 | Ma | ..................... G01C 21/32 |
| | | | 701/448 |

(Continued)

FOREIGN PATENT DOCUMENTS

CN 109509178 3/2019

OTHER PUBLICATIONS

Aquino, et al., "Detecting the optic disc boundary in digital fundus images using morphological, edge detection, and feature extraction techniques", IEEE TMI (2010).

(Continued)

*Primary Examiner* — Charlotte M Baker
(74) *Attorney, Agent, or Firm* — Bryan Cave Leighton Paisner LLP

(57) ABSTRACT

This disclosure relates to improved techniques for performing image segmentation functions using neural network architectures. The neural network architecture integrates an edge guidance module and object segmentation network into a single framework for detecting target objects and performing segmentation functions. The neural network architecture can be trained to generate edge-attention representations that preserve the edge information included in images. The neural network architecture can be trained to generate multi-scale feature information that preserves and enhances object-level feature information included in images. The edge-attention representations and multi-scale feature information can be fused to generate segmentation results that identify target object boundaries with increased accuracy.

20 Claims, 6 Drawing Sheets
(1 of 6 Drawing Sheet(s) Filed in Color)

(56) References Cited

U.S. PATENT DOCUMENTS

2019/0147296 A1    5/2019    Wang et al.

OTHER PUBLICATIONS

Berman, et al., "The lovasz-softmax loss: A tractable surrogate for the optimization of the intersection-over-union measure in neural networks", CVPR (2018).
Chen, et al., "DCAN: deep contour-aware networks for accurate gland segmentation", CVPR (2016).
Cheng, et. al., "Superpixel classification based optic disc and optic cup segmentation for glaucoma screening", IEEE TMI (2013).
Fu, et. al, "Joint Optic Disc and Cup Segmentation Based on Multi-Label Deep Network and Polar Transformation", IEEE TMI (2018).
Fu, et. al., "DeepVessel: Retinal Vessel Segmentation via Deep Learning and Conditional Random Field", MICCAI (2016).
He, et al., "Deep residual learning for image recognition", CVPR (2016).
Jaeger, et al., "Two public chest x-ray datasets for computer-aided screening of pulmonary diseases", (QIMS (2014).
Mansoor, et. al., "Segmentation and Image Analysis of Abnormal Lungs at CT: Current Approaches, Challenges, and Future Trends", Radiographics (2015).
Moccia, et al., "Blood vessel segmentation algorithms—review of methods, datasets and evaluation metrics", Computer Methods and Programs in Biomedicine (2018).
Ronneberger, et al., "U-Net: Convolutional Networks for Biomedical Image Segmentation", MICCAI (2015).
Shelhamer, et al., "Fully convolutional networks for semantic segmentation", TPAMI (2017).
Sivaswamy, et al., "Retinal image dataset for optic nerve head(onh) segmentation", IEEE ISBI (2014).
Staal, et al., "Ridge-based vessel segmentation in color images of the retina", IEEE TMI (2004).
Tsai, et al., "A shape-based approach to the segmentation of medical imagery using level sets", IEEE TMI (2003).
Wang, et. al., "Patch-based output space adversarial learning for joint optic disc and cup segmentation", IEEE TMI (2019).
The REFUGE challenge is open for participation [online], [retrieved May 28, 2019]. Retrieved from the Internet <URL:https://refuge.grand-challenge_org/>.
Finding and Measuring Lungs in CT Data [online], [retrieved Jun. ]. Retrieved from the Internet <URL: https://www.kaggle.com/kmader/finding-lungs-in-ct-data/data>.
Wang, P. et al., "Neighbourhood watch: Referring expression comprehension via language-guided graph attention networks", published Dec. 12, 2018, <URL:https://arxiv.org/pdf/1812.04794.pdf>, Retrieved from the Internet Oct. 14, 2019.
Li, P. et al., "Multi-Scale Aggregation Network for Direct Face Alignment", IEEE WACV Jan. 2019, <URL: https://dx-dev.computer.org/csdl/pds/api/csdl/proceedings/download-article/crawler-bypass/197500c156/pdf>, Retrieved from the Internet Oct. 14, 2019.
Harley, A. W. et al. "Segmentation-aware convolutional networks using local attention masks", IEEE ICCV 2017, <URL:http://openaccess.thecvf.com/content_ICCV_2017/papers/Harley_Segmentation-Aware_Convolutional_Networks_ICCV_2017_paper.pdf>, Retrieved from the Internet Oct. 14, 2019.
Ronneberger, O. et al., "U-Net: Convolutional Networks for Biomedical Image Segmentation", published May 18, 2015, <URL: https://arxiv.org/pdf/1505.04597_pdf>, Retrieved from the Internet Oct. 14, 2019.

* cited by examiner

Weighted Block

Decoding Block

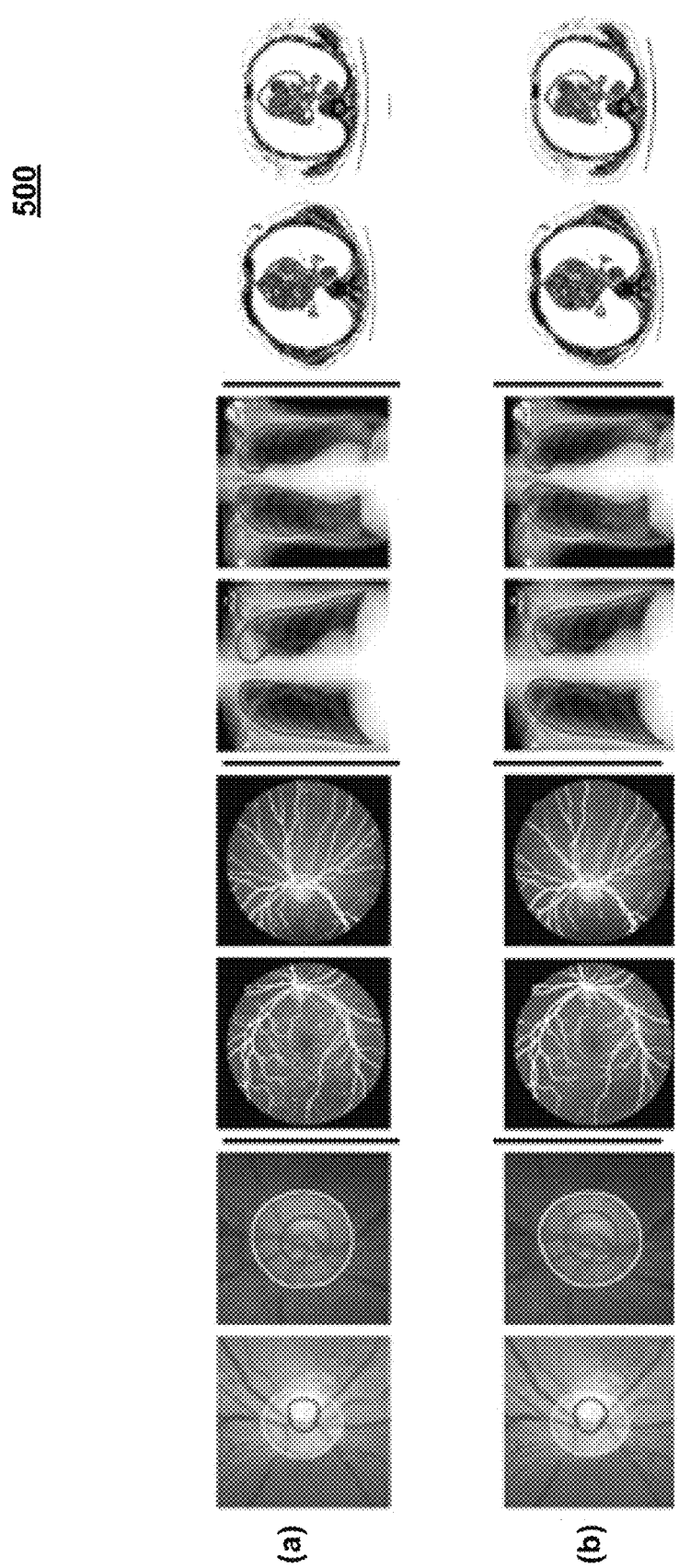

MEDICAL IMAGE SEGMENTATION USING AN INTEGRATED EDGE GUIDANCE MODULE AND OBJECT SEGMENTATION NETWORK

TECHNICAL FIELD

This disclosure is related to improved techniques for performing computer vision functions and, more particularly, to techniques that utilize trained neural networks and artificial intelligence (AI) algorithms to perform medical image segmentation using a combined edge guidance module and object segmentation network.

BACKGROUND

In the field of computer vision, image segmentation functions are utilized to identify and segment target objects in images. Image segmentation can be useful in a variety of contexts and applications. For example, medical image segmentation is an important aspect of medical image analysis. Accurately performing segmentation functions on medical images can provide significant insights into early manifestations of life-threatening diseases, and can assist medical practitioners with diagnosing patients and grading severities of diseases. Image segmentation is also useful in many other contexts and applications including intelligent surveillance systems, facial recognitions systems, etc.

Performing automated image segmentation using computer vision functions is a very complex and challenging task. To accurately perform automated image segmentation, the computer vision applications must account for a variety of technical problems. One technical problem relates to configuring and training a neural network architecture in an appropriate manner to enable identification of target object boundaries with high accuracy and precision. This is especially important in the context of medical images, given that the accuracy and precision of the segmentation results may affect patients' diagnoses and/or treatments. In medical image segmentation, different target objects can have similar appearances, thus making it difficult to accurately identify and segment the target objects. Additional complexities can arise in scenarios in which segmentation functions are performed on images that include inconspicuous objects that are overshadowed by irrelevant salient objects, which can cause neural network architectures to make false predictions.

BRIEF DESCRIPTION OF DRAWINGS

The patent or application file contains at least one drawing executed in color. Copies of this patent or patent application publication with color drawing(s) will be provided by the Office, upon request and payment of the necessary fee.

To facilitate further description of the embodiments, the following drawings are provided, in which like references are intended to refer to like or corresponding parts, and in which:

FIG. 5 is a chart showing exemplary segmentation results that were generated according to certain embodiments.

DETAILED DESCRIPTION OF EXEMPLARY EMBODIMENTS

Figure 1:
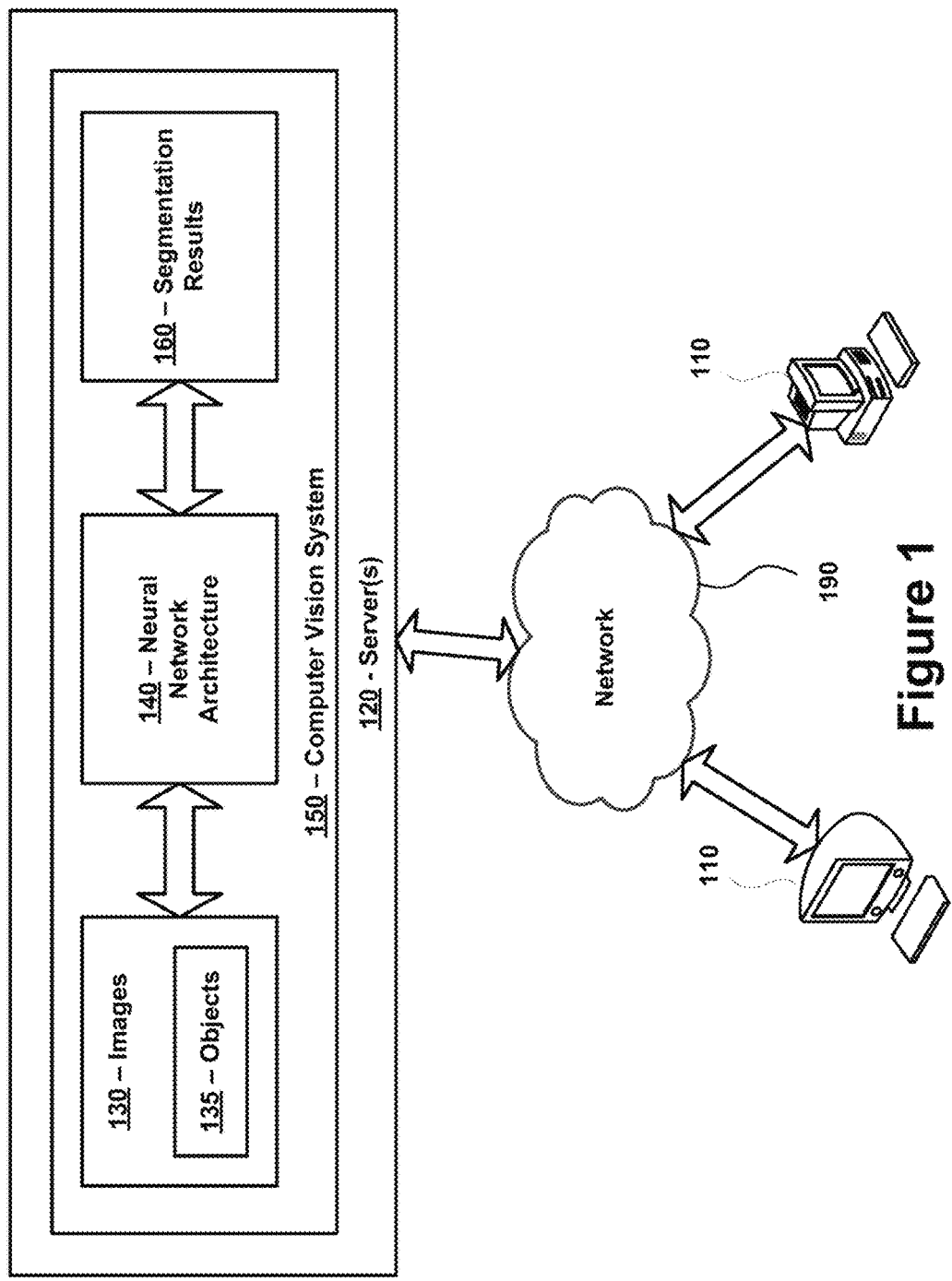
FIG. 1 is a diagram of an exemplary system in accordance with certain embodiments.

The present disclosure relates to systems, methods, and apparatuses that utilize improved techniques for performing computer vision functions, including medical image segmentation functions. A computer vision system includes a neural network architecture that can be trained to perform the image segmentation functions. The computer vision system can be configured to execute the image segmentation functions on medical images to identify precise locations of various medical objects (e.g., optic discs, vessels, lungs, and/or other anatomical objects) captured in the medical images. The computer vision system can additionally, or alternatively, execute image segmentation functions on other types of images to identify precise locations of non-medical objects (e.g., individuals, inanimate objects, etc.).

In certain embodiments, the neural network architecture integrates both an edge guidance module and an object segmentation network into a single framework for detecting target objects and performing the image segmentation functions. Combining the edge guidance module and object segmentation network in a single framework enables the neural network architecture to perform object boundary segmentation with increased accuracy due to the use of granular edge detection information, while also preserving the homogeneity and semantic characteristics of objects using object segmentation information. This unified framework enables image segmentation functions to be executed with both increased accuracy and minimal computational costs. Exemplary embodiments on this combined framework are described below.

Edge detection and object segmentation methods can each be associated with advantages and disadvantages. An exemplary edge detection method may involve initially identifying object boundaries utilizing local gradient representations, and then separating closed loop regions as objects. Edge detection methods are beneficial because they are able to obtain highly localized image information and can achieve high accuracy in boundary segmentation for simple objects. However, when dealing with more complex objects, the use of edge detection can result in the identification of non-relevant or trivial segmentation regions and discontinuous boundaries due a lack of high-level feature information. On the other hand, an exemplary object segmentation method may utilize global appearance models of foregrounds and backgrounds to identify target objects (e.g., classifying each pixel or image portion as being in the foreground or background). Object segmentation methods are advantageous because they preserve the homogeneity and semantic characteristics of the objects in images, and reduce the uncertainties in detecting the boundary positions. However, object segmentation methods tend to produce coarse segmentation results. Prior attempts to use post-processing operations (e.g., Conditional Random Field and shape fitting) to refine the coarse results tend to be very time-consuming and computationally expensive. As described in further detail below, the integrated frameworks adopted by the neural network architectures described herein are able to adopt the advantages, and eliminate (or at least reduce) the disadvantages, associated both edge detection and object segmentation methods.

In certain embodiments, the multiple layer neural network architecture of the computer vision system comprises an encoder-decoder network, an edge guidance module (EGM), and a weighted aggregation module (WAM). The encoder-decoder network can include any traditional or pre-trained encoder-decoder structure, such as ResNet-50, U-Net, or a combination thereof. The encoder of the encoder-decoder network receives input images and extracts class-specific, high-level features from the images to identify objects. The edge guidance module is connected to the early encoding blocks of the encoder-decoder structure, and utilizes the encoding information from these encoding blocks to extract edge-attention representations that include low-level features (e.g., granular edge information) associated with the input images. The decoder of the encoder-decoder network receives the outputs of the encoder and extracts multi-scale feature information that includes feature maps of varying sizes. The weighted aggregation module receives the outputs from both the edge guidance module and the decoding blocks of the encoder-decoder structure. In particular, the weighted aggregation module can receive the object-level, multi-scale feature information extracted by the decoder and the edge-attention representations, including the low-level features extracted by the edge guidance module. The weighted aggregation module fuses or combines the low-level features and high-level features to enhance the final segmentation results.

Both the edge guidance module and the weighted aggregation module may initially be trained using a set of annotated training images and one or more loss functions. In certain embodiments, the training images may be annotated with pixel-level annotation information that includes ground-truth pixel-level labels. The training images can additionally, or alternatively, include object-level annotation information. Both the edge guidance module and the weighted aggregation module may be trained using a combined segmentation loss function that includes separate constraints (e.g., Lovász-Softmax losses) for training the edge guidance module and the weighted aggregation module.

Once trained, the neural network architecture is capable of generating accurate segmentation results with reduced computational costs. The segmentation results can include any data or information associated with performing image segmentation functions. For example, the segmentation results output by the neural network architecture can include, inter alia, augmented images (e.g., images that are augmented with lines or bounding boxes identifying locations of objects) and/or other information that identifies locations or boundaries of target objects. The segmentation results can also include other information that was generated during the segmentation process, such as the edge-attention representations, feature maps, etc.

Extensive ablation studies and comparative experiments were conducted that demonstrate the effectiveness of the segmentation techniques described herein. Amongst other things, it has been shown that edge detection and object segmentation methods are mutually beneficial, and that the integration of these two segmentation techniques can significantly improve the accuracy of the segmentation results.

The technologies described herein can be used in a variety of different contexts and environments. One useful application of these technologies is in the context of medical systems and/or applications. Integrating these technologies into a medical system or application would permit a doctor, technician, researcher, and/or other individual to quickly identify medical objects (e.g., optic discs, optic cups, lungs, blood vessels, lesions, and/or cancerous cells) of interest. For example, these technologies can be used to identify medical or anatomic objects in various types of medical images (e.g., such as retinal images, fundus images, X-ray images, CT scan images, and/or related images), thus enabling a medical practitioner to quickly assess and/or diagnose patients' medical conditions. Similarly, in other embodiments, these technologies can be used to identify other types of target objects, such as individuals, portions of individuals (e.g., faces), and/or inanimate objects (e.g., weapons, furniture, toys, and/or any other objects of interest) captured in images. Such may be useful in the context of intelligent surveillance, social media, and/or other types of applications. The technologies discussed herein can be applied to many other contexts as well.

Furthermore, the image segmentation technologies described herein can be combined with other types of computer vision functions to supplement the functionality of the computer vision system. For example, in addition to performing image segmentation functions, the computer vision system can be configured to execute computer vision functions that automatically diagnose medical conditions, classify objects or images, and/or perform object counting. The accuracy and precision of the image segmentation technologies can aid in performing these and other computer vision functions.

As evidenced by the disclosure herein, the inventive techniques set forth in this disclosure are rooted in computer technologies that overcome existing problems in known computer vision systems, specifically problems dealing with object segmentation. The techniques described in this disclosure provide a technical solution (e.g., one that utilizes various AI-based neural networking and machine learning techniques) for overcoming the limitations associated with known techniques. For example, the image analysis techniques described herein take advantage of novel AI and machine learning techniques to learn functions for extracting edge-attention representations and fusing the edge-attention representations with high-level object features extracted from images. This technology-based solution marks an improvement over existing capabilities and functionalities related to computer vision systems by improving the accuracy of the image segmentation functions and reducing the computational costs associated with performing such functions.

In certain embodiments, a system is provided for analyzing images. The system includes one or more computing devices comprising one or more processors and one or more non-transitory storage devices for storing instructions, wherein execution of the instructions by the one or more processors causes the one or more computing devices to: receive an image comprising one or more objects at a neural network architecture comprising an encoder-decoder network, wherein the encoder-decoder network includes a plurality of encoding blocks and a plurality of decoding blocks; generate, using the neural network architecture, an edge-attention representation associated with the image, at least in part, utilizing encoding outputs of one or more encoding blocks included in the encoder-decoder network, wherein the edge-attention representation preserves local edge information included in the image; generate, using the neural network architecture, multi-scale feature information associated with the image, at least in part, utilizing decoding outputs of one or more decoding blocks included in the encoder-decoder network, wherein the multi-scale feature information preserves object-level features included in the image; and generate, using the neural network architecture, segmentation results corresponding to the image using both the edge-attention representation and the multi-scale feature information derived from the image, wherein the segmentation results identify boundaries of the one or more objects in the image.

In certain embodiments, a method is provided for analyzes images. The method comprises: receiving an image comprising one or more objects at a neural network architecture comprising an encoder-decoder network, wherein the encoder-decoder network includes a plurality of encoding blocks and a plurality of decoding blocks; generating, using the neural network architecture, an edge-attention representation associated with the image, at least in part, utilizing encoding outputs of one or more encoding blocks included in the encoder-decoder network, wherein the edge-attention representation preserves local edge information included in the image; generating, using the neural network architecture, multi-scale feature information associated with the image, at least in part, utilizing decoding outputs of one or more decoding blocks included in the encoder-decoder network, wherein the multi-scale feature information preserves object-level features included in the image; and generating, using the neural network architecture, segmentation results corresponding to the image using both the edge-attention representation and the multi-scale feature information derived from the image, wherein the segmentation results identify boundaries of the one or more objects in the image.

In certain embodiments, a computer program product is provided. The computer program product comprises a non-transitory computer-readable medium including instructions for causing a computer to: receive an image comprising one or more objects at a neural network architecture comprising an encoder-decoder network, wherein the encoder-decoder network includes a plurality of encoding blocks and a plurality of decoding blocks; generate, using the neural network architecture, an edge-attention representation associated with the image, at least in part, utilizing encoding outputs of one or more encoding blocks included in the encoder-decoder network, wherein the edge-attention representation preserves local edge information included in the image; generate, using the neural network architecture, multi-scale feature information associated with the image, at least in part, utilizing decoding outputs of one or more decoding blocks included in the encoder-decoder network, wherein the multi-scale feature information preserves object-level features included in the image; generate, using the neural network architecture, segmentation results corresponding to the image using both the edge-attention representation and the multi-scale feature information derived from the image, wherein the segmentation results identify boundaries of the one or more objects in the image.

The embodiments described in this disclosure can be combined in various ways. Any aspect or feature that is described for one embodiment can be incorporated into any other embodiment mentioned in this disclosure. Moreover, any of the embodiments described herein may be hardware-based, may be software-based, or may comprise a mixture of both hardware and software elements. Thus, while the description herein may describe certain embodiments, features, or components as being implemented in software or hardware, it should be recognized that any embodiment, feature, or component that is described in the present application may be implemented in hardware and/or software.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device), or may be a propagation medium. The medium may include a computer-readable storage medium, such as a semiconductor, solid state memory, magnetic tape, a removable computer diskette, a random access memory (RAM), a read-only memory (ROM), a programmable read-only memory (PROM), a static random access memory (SRAM), a rigid magnetic disk, and/or an optical disk, etc.

A data processing system suitable for storing and/or executing program code may include at least one processor coupled directly or indirectly to memory elements through a system bus. The at least one processor can include: one or more central processing units (CPUs), one or more graphical processing units (GPUs), one or more controllers, one or more microprocessors, one or more digital signal processors, and/or one or more computational circuits. The memory elements can include local memory employed during actual execution of the program code, bulk storage, and cache memories that provide temporary storage of at least some program code to reduce the number of times code is retrieved from bulk storage during execution. Input/output or I/O devices (including, but not limited to, keyboards, displays, pointing devices, etc.) may be coupled to the system, either directly or through intervening I/O controllers.

Network adapters may also be coupled to the system to enable the data processing system to become coupled to other data processing systems, remote printers, or storage devices through intervening private or public networks. Modems, cable modems, and Ethernet cards are just a few of the currently available types of network adapters.

FIG. 1 is a diagram of an exemplary system 100 in accordance with certain embodiments. The system 100 comprises one or more computing devices 110 and one or more servers 120 that are in communication over a network 190. A computer vision system 150 is stored on, and executed by, the one or more servers 120. The network 190 may represent any type of communication network, e.g., such as one that comprises a local area network (e.g., a Wi-Fi network), a personal area network (e.g., a Bluetooth network), a wide area network, an intranet, the Internet, a cellular network, a television network, and/or other types of networks.

All the components illustrated in FIG. 1, including the computing devices 110, servers 120, and computer vision system 150, can be configured to communicate directly with each other and/or over the network 190 via wired or wireless communication links, or a combination of the two. Each of the computing devices 110, servers 120, and computer vision system 150 can also be equipped with one or more transceiver devices, one or more computer storage devices (e.g., RAM, ROM, PROM, SRAM, etc.), and one or more processing devices (e.g., CPUs, GPUs, etc.) that are capable of executing computer program instructions. The computer storage devices can be physical, non-transitory mediums.

In certain embodiments, the computing devices 110 may represent desktop computers, laptop computers, mobile devices (e.g., smart phones, personal digital assistants, tablet devices, vehicular computing devices, or any other device that is mobile in nature), and/or other types of devices. The one or more servers 120 may generally represent any type of computing device, including any of the computing devices 110 mentioned above. In certain embodiments, the one or more servers 120 comprise one or more mainframe computing devices that execute web servers for communicating with the computing devices 110 and other devices over the network 190 (e.g., over the Internet).

In certain embodiments, the computer vision system 150 is stored on, and executed by, the one or more servers 120. The computer vision system 150 can be configured to perform any and all functions associated with analyzing images 130 and/or generating segmentation results 160. This may include, but is not limited to, computer vision functions related to performing object segmentation (e.g., which may include identifying locations of objects 135 in the images 130), object and image classification (e.g., which may include classifying the objects identified in the medical images 130 or the images 130 themselves), and/or other related functions. In certain embodiments, the segmentation results 160 output by the computer vision system 150 can identify boundaries of target objects 135 with pixel-level accuracy.

The images 130 provided to, and analyzed by, the computer vision system 150 can include any type of image. In certain embodiments, the medical images 130 can include one or more two-dimensional (2D) images. In certain embodiments, the medical images 130 may additionally, or alternatively, include one or more three-dimensional (3D) images. The images 130 may be captured in any digital or analog format and may be captured using any color space or color model. Exemplary image formats can include, but are not limited to, JPEG (Joint Photographic Experts Group), TIFF (Tagged Image File Format), GIF (Graphics Interchange Format), PNG (Portable Network Graphics), etc. Exemplary color spaces or models can include, but are not limited to, sRGB (standard Red-Green-Blue), Adobe RGB, gray-scale, etc. In certain embodiments, pre-processing functions can be applied to the images 130 to adapt the images 130 to a format that can assist the computer vision system 150 with analyzing the images 130.

The images 130 received by the computer vision system 150 can be captured by any type of image capturing device. Such devices can include imaging sensors, cameras, scanning devices, and/or optical devices. For example, the image capturing devices can include fundus cameras, slit lamp cameras, ophthalmic imaging devices, computerized tomography (CT) scanning devices, computerized axial tomography (CAT) scanning devices, X-ray scanning devices, positron emission tomography (PET) scanning devices, magnetic resonance imaging (MRI) devices, and/or other similar devices. The image capturing devices can further include still image cameras, video cameras, and/or other devices that include image/video sensors. In certain embodiments, one or more of the image capturing devices can be equipped with analog-to-digital (A/D) converters and/or digital-to-analog (D/A) converters, depending on the configuration or design of the image capturing devices.

In certain embodiments, the images 130 processed by the computer vision system 150 can include one or more medical images that are useful for analyzing and/or diagnosing a medical condition, or for analyzing a patient or an anatomical feature associated with a patient. The types of medical images provided to the computer vision system can vary. For example, the images 130 can include medical images that depict or capture eyes, bones, nerves, organs (e.g., lungs, hearts, brains, etc.), disease-related objects (e.g., cancer-related objects), etc. As explained in further detail below, in certain embodiments, the images 130 may correspond to retinal images that depict optic discs and blood vessels, and/or X-ray and CT images that depict chest regions.

Some or all of the images 130 can include one or more objects 135. Generally speaking, any type of object may be included in an image 130, and the types of objects 135 included in an image 130 can vary greatly. In certain embodiments, the objects 135 included in an image 130 can correspond to medical or anatomical objects (e.g., organs, blood vessels, optic discs, disease-related objects, lungs, hearts, brains, aneurysms, hemorrhages, tumors, etc.), and the computer vision system is configured to perform object segmentation to precisely identify the medical or anatomical objects. Certain examples discussed below describe embodiments in which the computer vision system 150 is configured to perform object segmentation to precisely identify the optic discs, optic cups, blood vessels, and/or lungs included in the images 130. The computer vision system 150 can additionally, or alternatively, be configured to execute the image segmentation functions on other types of images to identify precise locations of non-medical objects 135, which may include both living and inanimate objects (e.g., individuals, vehicles, furniture, computers, animals, trees, electronic devices, and/or any other target objects of interest).

The images 130 received by the computer vision system 150 can be provided to the neural network architecture 140 for processing and/or analysis. In certain embodiments, the neural network architecture 140 may comprise a convolutional neural network (CNN), or a plurality of convolutional neural networks. Each CNN may represent an artificial neural network that is inspired by biological processes, and may be configured to analyze images 130, and to execute deep learning functions and/or machine learning functions on the medical images 130. Each CNN may include a plurality of layers including, but not limited to, one or more input layers, one or more output layers, one or more convolutional layers (e.g., that include learnable filters), one or more ReLU (rectifier linear unit) layers, one or more pooling layers, one or more fully connected layers, one or more normalization layers, etc. The configuration of the CNNs and their corresponding layers enable the CNNs to learn and execute various functions for analyzing, interpreting, and understanding the images 130. Exemplary configurations of the neural network architecture 140 are discussed in further detail below.

In certain embodiments, the neural network architecture 140 can be trained to perform one or more computer vision functions to analyze the images 130. For example, the neural network architecture 140 can analyze an image 130 to perform object segmentation functions, which may include identifying locations of the objects 135 in the image 130. In certain embodiments, the object segmentation functions can identify the locations of objects 135 with pixel-level accuracy. The neural network architecture 140 can additionally analyze the images 130 to perform other computer vision functions (e.g., object classification, object counting, disease diagnosis functions, disease grading functions, and/or other functions).

The neural network architecture 140 of the computer vision system 150 can be configured to generate and output segmentation results 160 based on an analysis of the images 130. The segmentation results 160 for an image 130 can generally include any information or data associated with analyzing, interpreting, and/or identifying objects 135 included in the images 130. In certain embodiments, the segmentation results 160 can include information or data that indicates the results of the computer vision functions performed by the neural network architecture 140. For example, the segmentation results 160 may include information that identifies the results associated with performing the object segmentation functions and/or other functions executed by the computer vision system 150.

In certain embodiments, the segmentation results 160 can include information that indicates whether or not one or more objects 135 were detected in each of the images 130. The segmentation results 160 can include data that indicates the locations of the objects 135 identified in each of the images 130. For example, the segmentation results 160 for an image 130 can include an annotated version of an image 130, which identifies each of the objects 135 (e.g., optic discs, lungs, etc.) included in the image, and which includes lines or annotations surrounding the perimeters, edges, or boundaries of the objects 135. In certain embodiments, the objects 135 may be identified with pixel-level accuracy. The segmentation results 160 can include other types of data or information for identifying the locations of the objects (e.g., such as coordinates of the objects 135 and/or masks identifying locations of objects 135). Other types of information and data can be included in the segmentation results 160 output by the neural network architecture 140 as well.

In certain embodiments, the neural network architecture 140 can be trained to perform these and other computer vision functions using any supervised, semi-supervised, and/or unsupervised training procedure. In certain embodiments, the neural network architecture 140, or portion thereof, is trained using a supervised or semi-supervised training procedure. The neural network architecture 140 can be trained using training images that are annotated with pixel-level ground-truth information in certain embodiments. One or more loss functions may be utilized to guide the training procedure applied to the neural network architecture 140.

In the exemplary system 100 of FIG. 1, the computer vision system 150 may be stored on, and executed by, the one or more servers 120. In other exemplary systems, the computer vision system 150 can additionally, or alternatively, be stored on, and executed by, the computing devices 110 and/or other devices. The computer vision system 150 can additionally, or alternatively, be integrated into an image capturing device that captures one or more of the images 130, thus enabling image capturing device to analyze the images 130 using the techniques described herein. Likewise, the computer vision system 150 can also be stored as a local application on a computing device 110, or integrated with a local application stored on a computing device 110 to implement the techniques described herein. For example, in certain embodiments, the computer vision system 150 can be integrated with (or can communicate with) various applications including, but not limited to, medical applications, research applications, and/or other applications that are stored on a computing device 110 and/or server 120.

In certain embodiments, the one or more computing devices 110 can enable individuals to access the computer vision system 150 over the network 190 (e.g., over the Internet via a web browser application). For example, after an image capturing device has captured one or more images 130, an individual can utilize the image capturing device or a computing device 110 to transmit the one or more images 130 over the network 190 to the computer vision system 150. The computer vision system 150 can analyze the one or more images 130 using the techniques described in this disclosure. The segmentation results 160 generated by the computer vision system 150 can be transmitted over the network 190 to the image capturing device and/or computing device 110 that transmitted the one or more images 130.

Figure 2:
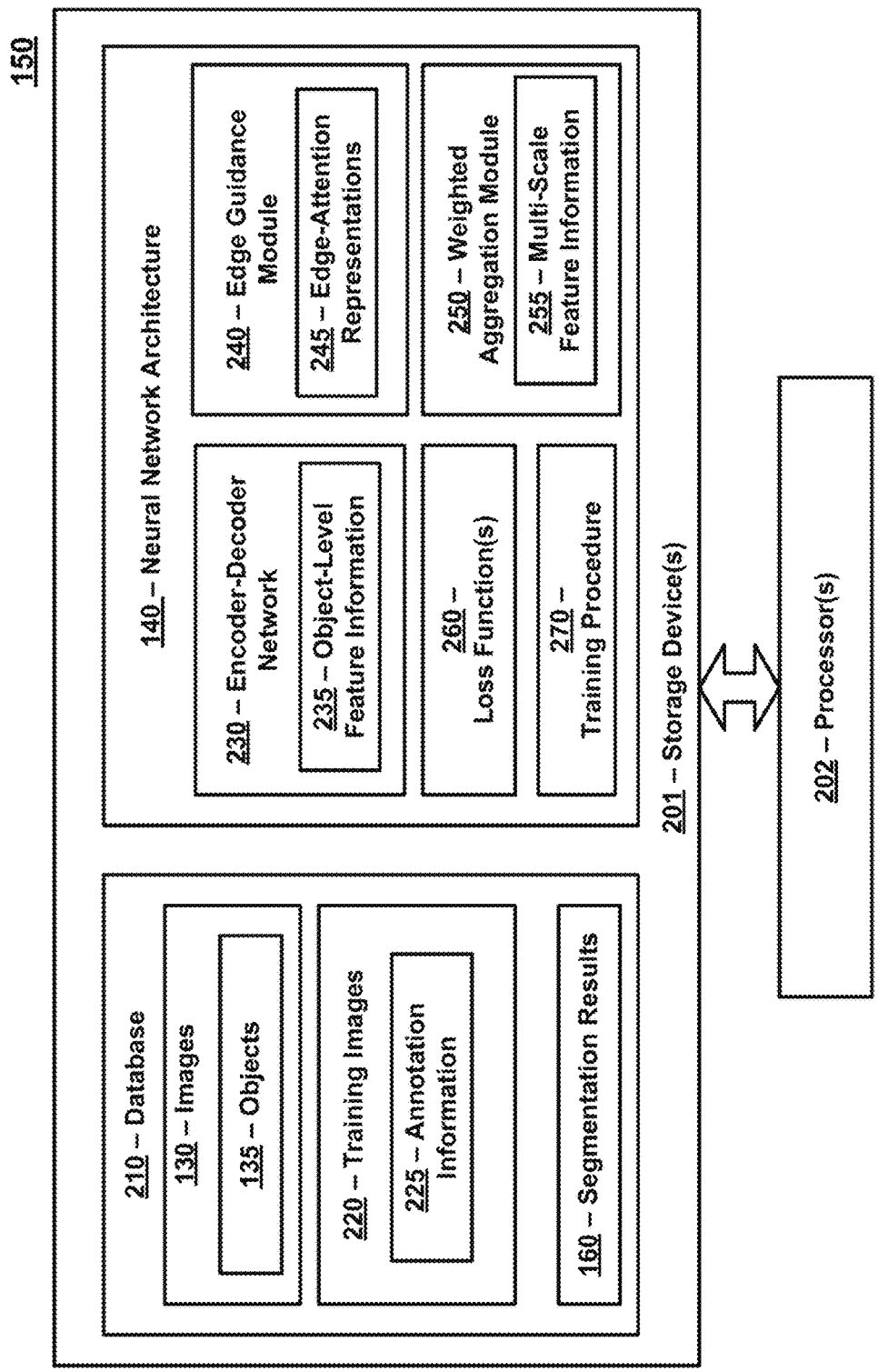
FIG. 2 is a block diagram of an exemplary computer vision system in accordance with certain embodiments.

FIG. 2 is a block diagram of an exemplary computer vision system 150 in accordance with certain embodiments. The computer vision system 150 includes one or more storage devices 201 that are in communication with one or more processors 202. The one or more storage devices 201 can include: (i) non-volatile memory, such as, for example, read-only memory (ROM) or programmable read-only memory (PROM); and/or (ii) volatile memory, such as, for example, random access memory (RAM), dynamic RAM (DRAM), static RAM (SRAM), etc. In these or other embodiments, storage devices 201 can comprise (i) non-transitory memory and/or (ii) transitory memory. The one or more processors 202 can include one or more graphical processing units (GPUs), central processing units (CPUs), controllers, microprocessors, digital signal processors, and/or computational circuits. The one or more storage devices 201 can store data and instructions associated with one or more databases 210 and a neural network architecture 140 that comprises an encoder-decoder network 230, an edge guidance module 240, a weighted aggregation module 250, one or more loss functions 260, and one or more training procedures 270. The one or more processors 202 are configured to execute instructions associated with these components. Each of these components is described in further detail below.

The database 210 stores the images 130 that are provided to and/or analyzed by the computer vision system 150, as well as the segmentation results 160 that are generated by the computer vision system 150. The database 210 also stores a set of training images 220 that are utilized to train the neural network architecture 140. Although not shown in FIG. 2, the database 210 can store any other data or information mentioned in this disclosure including, but not limited to, edge-attention representations 245, object-level features 235, multi-scale feature information 255, one or more loss functions 260, etc.

The training images 220 can be utilized in connection with a training procedure 270 to train the edge guidance module 240 and the weighted aggregation module 250. The training images 220 can include various types of annotation information 225 to assist with such training. For example, in certain embodiments, the annotation information 225 can include pixel-level labels and/or pixel-level annotations identifying the boundaries and locations of objects 135 in each of the training images 220. The annotation information 225 can additionally, or alternatively, include image-level and/or object-level annotations identifying the objects 135 in each of the training images 220. In certain embodiments, some or all of the training images 220 may be obtained from one more public datasets, e.g., such as the Retinal Fundus Glaucoma (REFUGE), Drishti-GS, Digital Retinal Images for Vessel Extraction (DRIVE), Montgomery County (MC), and/or Lung Nodule Analysis (LUNA) datasets.

The neural network architecture 140 can be trained to perform image segmentation functions and other computer vision functions. In certain embodiments, the neural network architecture 140 includes an encoder-decoder network 230, edge guidance module 240, and weighted aggregation module 250 that enable the neural network architecture 140 to perform image segmentation functions. The configurations and implementations of the neural network architecture 140, including the encoder-decoder network 230, the edge guidance module 240, and the weighted aggregation module 250, can vary.

In certain embodiments, the encoder-decoder network 230 includes one or more encoding blocks and one or more decoding blocks. The one or more encoding blocks of the encoder-decoder network 230 can be configured to extract object-level feature information 235 that identify objects 135 included in the images 130. Each encoding block can correspond to a different feature map resolution. The object-level feature information 235 can include feature maps that identify class-specific, high-level features included in the images 130. The one or more decoding blocks can receive the object-level feature information 235 output by the encoding blocks, and utilize the object-level feature information 235 to generate multi-scale feature information 255 that enhances the representations of the high-level features or objects included in the object-level feature information 235.

The encoder-decoder network 230 may utilize one or more pre-trained models to identify and extract the object-level feature information 235 from the images 130. For example, in certain embodiments, the encoder-decoder network 230 may utilize ResNet-50 and/or any other pre-trained model to extract the object-level feature information 235 corresponding to the objects 135 in the images 130. In certain embodiments, the encoder-decoder network 230 may execute object segmentation functions that utilize foreground and background information to derive the object-level feature information 235 and multi-scale feature information 255 identifying the target objects 135 in the images 130. Generally speaking, the object-level feature information 235 comprises high-level or coarse feature representations that preserve the homogeneity and semantic characteristics of objects 135. The object-level feature information 235 map may include feature maps that identify the high-level or coarse feature representations. Both the decoder blocks of the encoder-decoder network and weighted aggregation module can process the object-level feature information 235 to enhance the features that are relevant for image segmentation. The multi-scale feature information 255 can include the enhanced outputs identifying the high-level or coarse feature representations. This data is considered "multi-scale" in the sense that it may include, or be derived from, the decoding blocks, each of which identifies the feature representations using a different feature map resolution or scale.

The edge guidance module 240 can be trained to extract edge-attention representations 245 from each of the images 130. The edge guidance module 240 can utilize data received from one or more encoding blocks of the encoder-decoder network 230 to generate the edge-attention representations 245. In certain embodiments, the edge guidance module 240 receives data generated by the early encoding layers (e.g., the first and second encoding blocks) of the encoder-decoder network 230 to generate the edge-attention representations 245. Using the data output by the early encoding layers can be beneficial because the edge detail information is still largely preserved.

The edge-attention representations 245 generated by the edge guidance module 240 include low-level features and fine-grained constraints that are useful for performing image segmentation. Each edge-attention representation 245 preserves the edge information included in a corresponding image 130. In certain embodiments, the edge-attention representations 245 are generated by identifying object boundaries utilizing local gradient representations, and then separating closed loop regions as objects 135. The edge-attention representations 245 can be fused, combined, or otherwise utilized with the multi-scale feature information 255 derived from the encoder-decoder network 230 to improve the accuracy of the image segmentation tasks.

The weighted aggregation module 250 can be configured to fuse or combine the multi-scale feature information 255 and the edge-attention representations 245 to generate the segmentation results 160. The weighted aggregation module 250 can be connected to one or more decoding blocks (e.g., decoding layers) of the encoder-decoder network 230 to obtain the multi-scale feature information 255. In certain embodiments, the weighted aggregation module 250 is connected to each decoding block included in the encoder-decoder network 230, and the outputs from each decoding block are provided to weighting functions that process the outputs to identify relevant object information. The outputs from the weighting functions include a hierarchy of feature maps having different sizes or resolutions. An upsampling operation is used to resize these outputs of the weighting functions to the same sizes, and then these outputs can be summed or aggregated to derive the multi-scale feature information 255. The weighted aggregation module 250 can then concatenate or fuse the multi-scale feature information 255 with corresponding edge-attention representations 245 to derive the segmentation results 160 for each of the images 130.

The training procedure 270 utilized to train the edge guidance module 240 and the weighted aggregation module 250 can vary. As indicated above, in certain embodiments, the training procedure 270 may include a semi-supervised or supervised training procedure 270 that utilizes the training images 220 and corresponding annotation information 225 to train the edge guidance module 240 and the weighted aggregation module 250.

In certain embodiments, the training procedure 270 executed by the neural network architecture 140 can utilize one or more loss functions 260 to optimize the edge guidance module 240 and the weighted aggregation module 250. Any appropriate loss function 260 can be utilized to train and optimize these modules. In certain embodiments, training procedure 270 utilizes a segmentation loss function that utilizes a separate Lovász-Softmax loss to optimize both the edge guidance module 240 and the weighted aggregation module 250.

It should be apparent that the computer vision system 150 described herein can be adapted to perform image segmentation functions to identify objects 135 included in a wide variety of images 130. Thus, while certain portions of the disclosure herein may describe embodiments that involve analysis of medical images (e.g., retinal images, X-ray images, and/or CT images), it would be apparent to one of ordinary skill in the art that such embodiments can easily be adapted to perform image segmentation functions on other types of images 130.

Exemplary embodiments of the computer vision system 150 and the aforementioned sub-components (e.g., the database 210, neural network architecture 140, encoder-decoder network 230, edge guidance module 240, weighted aggregation module 250, loss functions 260, and training procedure 270) are described in further detail below. While the sub-components of the computer vision system 150 may be depicted in FIG. 2 as being distinct or separate from one another, it should be recognized that this distinction may be a logical distinction rather than a physical or actual distinction. Any or all of the sub-components can be combined with one another to perform the functions described herein, and any aspect or feature that is described as being performed by one sub-component can be performed by any or all of the other sub-components. Also, while the sub-components of the computer vision system 150 may be illustrated as being implemented in software in certain portions of this disclosure, it should be recognized that the sub-components described herein may be implemented in hardware and/or software.

Figure 3:
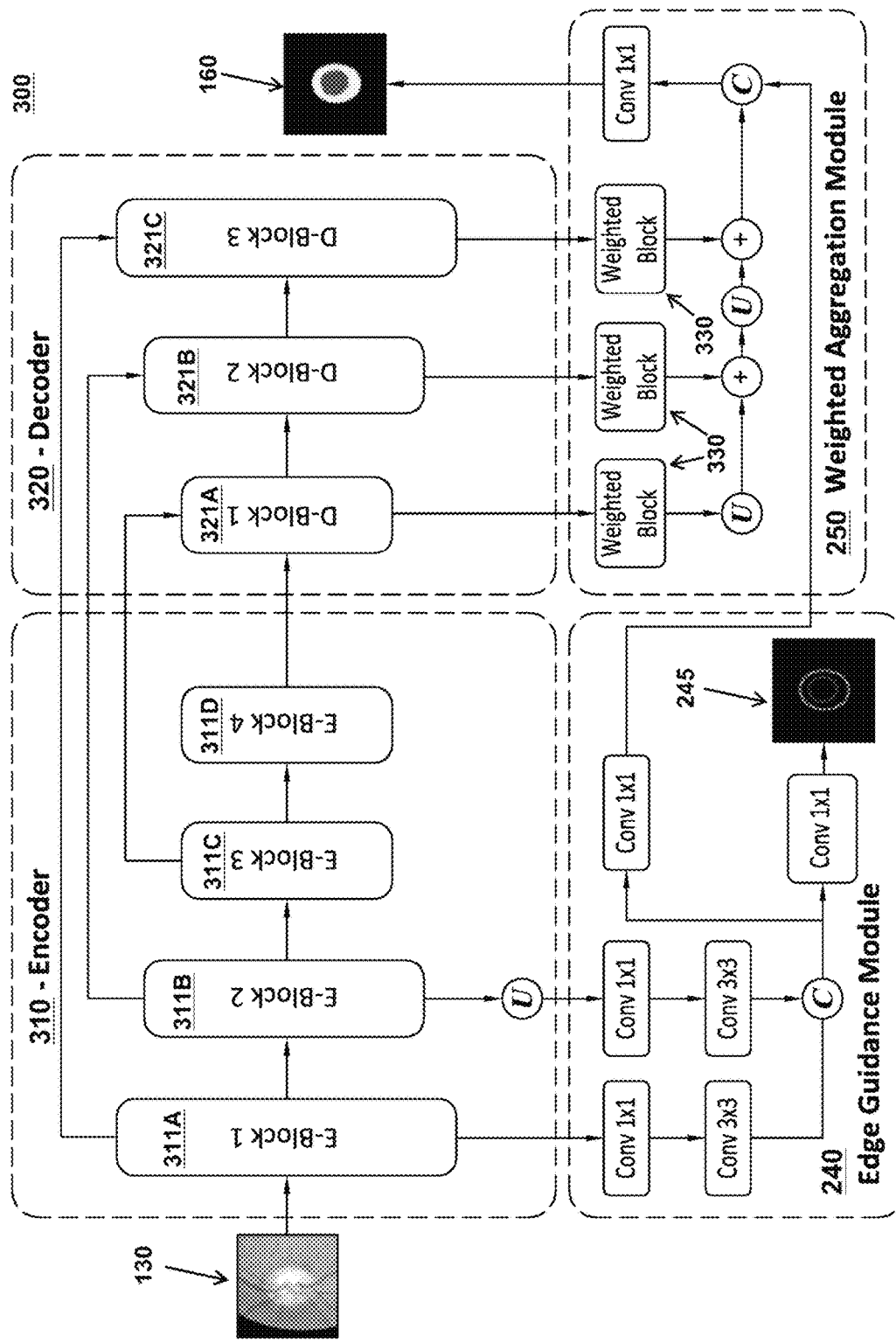
FIG. 3 is a diagram illustrating an exemplary architecture for a computer vision system in accordance with certain embodiments.

FIG. 3 is a diagram illustrating an exemplary architecture 300 for a computer vision system 150 in accordance with certain embodiments. The architecture 400 illustrates, inter alia, exemplary configurations for the neural network architecture 140 of the computer vision system 150. Exemplary configuration details for the encoder-decoder network 230 (shown separately as encoder 310 and decoder 320), edge guidance module 240, and weighted aggregation 250 are illustrated and discussed in further detail below.

FIG. 3 utilizes the following notations to denote certain functions or structures: "Conv" denotes a convolutional layer or function; "U" denotes an upsampling layer or function; "C" denotes a concatenation layer or function; and "+" denotes addition layer or function. The same notations also apply to FIGS. 4A and 4B, which are discussed in further detail below.

On the left side of FIG. 3, one or more images 130 are received at an encoder 310. In certain embodiments, the encoder 310 may be implemented, at least in part, using the ResNet-50 architecture. The encoder 310 comprises four cascading encoding layers or encoding blocks 311 (i.e., encoding block one 311A, encoding block two 311B, encoding block three 311C, and encoding block four 311D), each of which is configured to generate a feature map having a different resolution. At each encoding block 311, the data associated with the input image 130 is subjected to a feature extraction function which consists of a stack of 1×1, 3×3, and 1×1 convolutional layers that are summed with a shortcut of inputs to generate outputs for the encoder block 311. Using this residual connection scheme, the encoder 310 can generate or extract class-specific, high-level features (e.g., object-level feature information 235) that is passed to the decoder 320.

The decoder 320 comprises three cascading decoding layers or decoding blocks 321 (i.e., decoding block one 321A, decoding block two 321B, and decoding block three 321C). In certain embodiments, the decoder 320 may be implemented, at least in part, using the U-Net architecture. The three cascading decoding blocks 321 in the decoder path may be utilized to maintain the characteristics of the high-level features (e.g., the object-level feature information 235) extracted by the encoding blocks 311 and to enhance their representation ability.

Figure 4B:
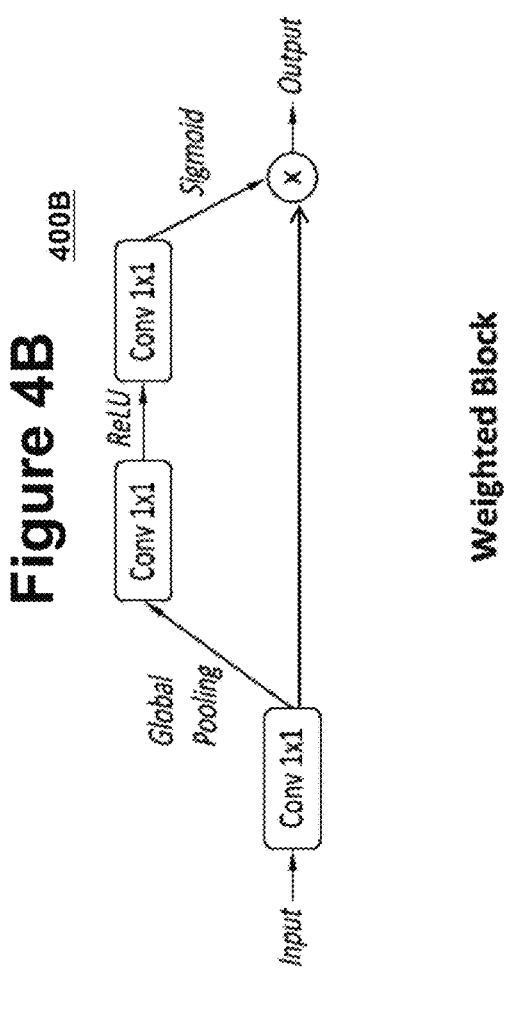
FIG. 4B is a diagram illustrating an exemplary architecture for a weighted block according to certain embodiments.
Figure 4A:
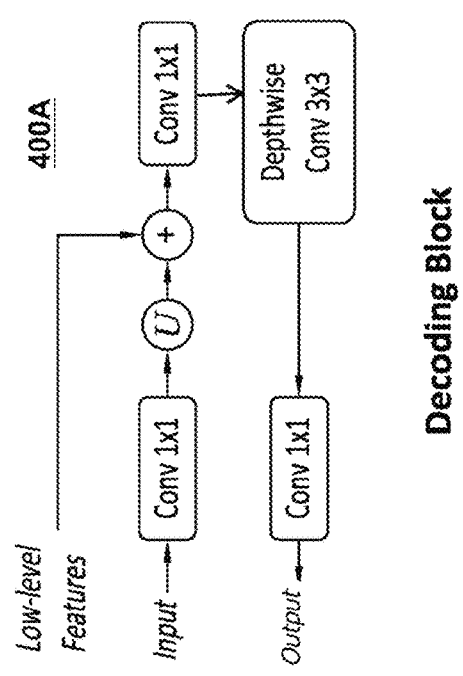
FIG. 4A is a diagram illustrating an exemplary architecture for a decoding block according to certain embodiments.

FIG. 4A is a diagram illustrating an exemplary architecture 400A for a decoding block 321 according to certain embodiments. As shown, each decoding block 321 may include a depth-wise convolution to enhance the representation of the combined low-level and high-level features extracted by the encoder 310. Next, a 1×1 convolution is used to unify the number of channels.

Returning to FIG. 3, the edge guidance module 240 utilizes the outputs of certain encoder blocks 310 to generate edge-attention representations 245 that preserve the local edge characteristics in the early encoding layers. The edge-attention representations 245 preserve this edge information which provides useful fine-grained constraints to guide feature extraction during segmentation. However, because only low-level features preserve sufficient edge information, only the outputs of the early encoding layers (e.g., encoding block one 311A and encoding block two 311B) are used to generate the edge-attention representations 245. As discussed herein, the edge guidance module 240 performs at least two functions: 1) it generates or extracts edge-attention representations 245 to guide the process of segmentation in the decoding path; and 2) it supervises the early convolutional layers using an edge detection loss, as discussed further below.

Exemplary details for implementing an edge guidance module 240 are illustrated in FIG. 3. The outputs of encoding block two 311B are upsampled to the same resolution as the outputs of encoding block one 311A, and then the outputs from both blocks are passed to 1×1 and 3×3 convolutional layers and concatenated together. The concatenated features are passed to at least one of two branches: (1) a first branch that includes a 1×1 convolutional layer and which passes the edge-attention representations 245 to the weighted aggregation module 250 in the decoding path; and (2) a second branch that includes another 1×1 convolutional layer that utilizes the edge-attention representations 245 to predict the edge detection results for early supervision. In certain embodiments, a Lovász-Softmax loss is used in guide supervision in the edge guidance module 240, since it performs better than cross-entropy loss for class imbalanced problems. In certain embodiments, the loss can be formulated as follows:

$$L = \frac{1}{c}\sum_{c\in C} \overline{\Delta_{J_C}}(m(c)) \quad (1)$$

wherein:
L denotes the loss;
c denotes the class number;
$\overline{\Delta_{J_C}}$ is the Lovász extension of the Jaccard index;
m is the function as:

$$m_i(c) = \begin{cases} 1 - p_i(c), & \text{if } c = y_i(c), \\ p_i(c), & \text{otherwise,} \end{cases} \quad (2)$$

wherein:
$y_i(c) \in \{-1, 1\}$ is the ground truth label of pixel i for class c;
$p_i(c) \in [0,1]$ is the predicted probability of pixel i for class c.

Using this edge supervision, the edge features transmitted to the weighted aggregation module 250 in the decoding path are better able to guide the extraction of discriminative features in high-level layers.

In order to adapt to the shape and size variations of objects 135, traditional segmentation methods tend to sum up multi-scale outputs along the channel dimension for final predictions. However, not all features in high-level layers are activated and assist with the recovery of objects. Aiming to address this, the weighted aggregation module 250 is configured to emphasize the valuable features, and aggregate multi-scale feature information 255 and edge-attention representations 245 to improve the segmentation performance. The outputs of each decoding block 321 are provided to weighted blocks 330, which serve to highlight and identify the valuable feature information.

FIG. 4B is a diagram illustrating an exemplary architecture 400B for a weighted block 330 according to certain embodiments. In each weighted block 330, a global average pooling is first employed to aggregate the global context information of inputs, and then two 1×1 convolutional layers with different non-linearity activation functions (e.g., ReLU and Sigmoid functions) are applied to estimate the layer relevance and generate the weights along the channel dimension. The generated weights are then multiplied with the outputs of the convolutional layer to yield more representative features.

Returning to FIG. 3, the weighted aggregation module 250 integrates the features of different scales via a bottom-up pathway, which generates a feature hierarchy that comprises feature maps of different sizes. The weighted aggregation module 250 also concatenates edge-attention representations 245 from the edge guidance module 240, and applies a 1×1 convolution to extract features under edge-guided conditions. As with the edge detection in the edge guidance module 240, the weighted aggregation module 250 can also utilize the same Lovász-Softmax loss as the segmentation loss function. Thus, the total loss function of neural network architecture 140 can be defined as:

$$L_{total} = \alpha \cdot L_{seg} + (1-\alpha) \cdot L_{edge} \qquad (3)$$

wherein:

$L_{seg}$ denotes the loss for the weighted aggregation module;

$L_{edge}$ denotes the loss for the edge guidance module;

α is a constant which may be set to 0.3;

$L_{total}$ is the total loss.

Extensive experiments have demonstrated that the resulting neural network architecture 140 is capable of performing image segmentation functions with very high accuracy and relatively low computational costs.

FIG. 5 is a chart 500 illustrating exemplary segmentation results 160 generated by an embodiment of the neural network architecture 140. In particular, the images 130 in row (a) are ground-truth images identifying the target objects 135, and the images 130 in row (b) are annotated images that were generated by the neural network architecture 140 identifying the target objects 135. The images in row (b) illustrate exemplary segmentation results 160 that can be output by the neural network architecture 140. As shown, the images in row (b) are very close to the ground-truth images in row (a).

The manner in which the neural network architecture 140 can be configured, tested, and/or executed can vary. In certain embodiments, the datasets used for testing and/or training the neural network architecture 140 may be augmented in various ways. For example, in certain embodiments, the datasets including the images may be augmented by applying a random mirror and/or random scale function which ranges from 0.5 to 2, and random color jitter functions with a probability of 0.5. The augmented image dataset may also be randomly cropped to 512×512.

Furthermore, in certain embodiments, the initial weights of the encoder 310 come from ResNet-50 pre-trained on ImageNet dataset, and the parameters of the other layers can be randomly initialized. A dilation strategy may be used in encoding block four 311D with an output stride of ⅟₁₆. During training, the batch_size can be set to 16 with synchronized batch normalization, and a 'poly' learning rate scheduling $r=base\_lr \times (1-iters/total\_iters)^{power}$ can be adopted in which the power is set to 0.9 and base_lr is 0.005. The total_iters can calculated by the num_images×epochs/batch_size, where epochs is set to 300 for all datasets. The deep models can be optimized using an Adam optimizer with a momentum of 0.9 and a weight decay of 0.0005. The whole framework can be implemented using PyTorch. In certain embodiments, training (300 epochs) was performed in approximately 2.5 hours on one NVIDIA Titan Xp GPU.

During testing, the segmentation results, including edge detection and object segmentation, are produced within 0.015 sec. per image.

Experiments were performed and evaluated on at least three types of medical images: retinal images, X-ray images, and CT images. A first set of experiments involved optic disc/cup segmentation in retinal images, which is a common task in glaucoma detection. Two public datasets were used in this experiment: the REFUGE dataset, which consists of 400 training images and 400 validation images; and the Drishti-GS dataset, which contains 50 training images and 51 validation images. Due to the negative influence of non-target areas in fundus images, the disc centers were initially localized using an automatic disc detection method, and the localized images were transmitted to the neural network architecture 140 for analysis. The results were compared with various segmentation methods, including FCN, U-Net, M-Net, Multi-task, and pOSAL. The solution discussed herein achieved the best performance on both the REFUGE and Drishti-GS datasets.

A second set of experiments involved vessel segmentation in retinal images. The DRIVE dataset was used, which contains 20 images for training and 20 for testing. The results were compared with the same segmentation methods mentioned above, and the results again demonstrated that the solution discussed herein achieves the best performance, with 77.44% mean intersection-over-union (mIoU) and 95.60% accuracy, when compared with existing segmentation methods.

A third set of experiments involved lung segmentation on chest X-rays, which is a component for computer-aided diagnosis of lung health. The Montgomery County (MC) dataset was used, which contains 80 training images and 58 testing images. The results were compared with the same existing segmentation methods mentioned above, and the results again demonstrated that the solution discussed herein achieves the best performance, with an accuracy of 98.65% and an mIoU of 94.20%.

A fourth set of experiments involved lung segmentation from CT images, which is fundamental for further lung nodule disease diagnosis. The Lung Nodule Analysis (LUNA) competition dataset was used, which is divided into 214 images for training and 53 images for testing. The results were compared with the same existing segmentation methods mentioned above, and the results again demonstrated that the solution discussed herein achieves the best performance, with an accuracy of 98.68% and an mIoU of 96.23%.

Figure 6:
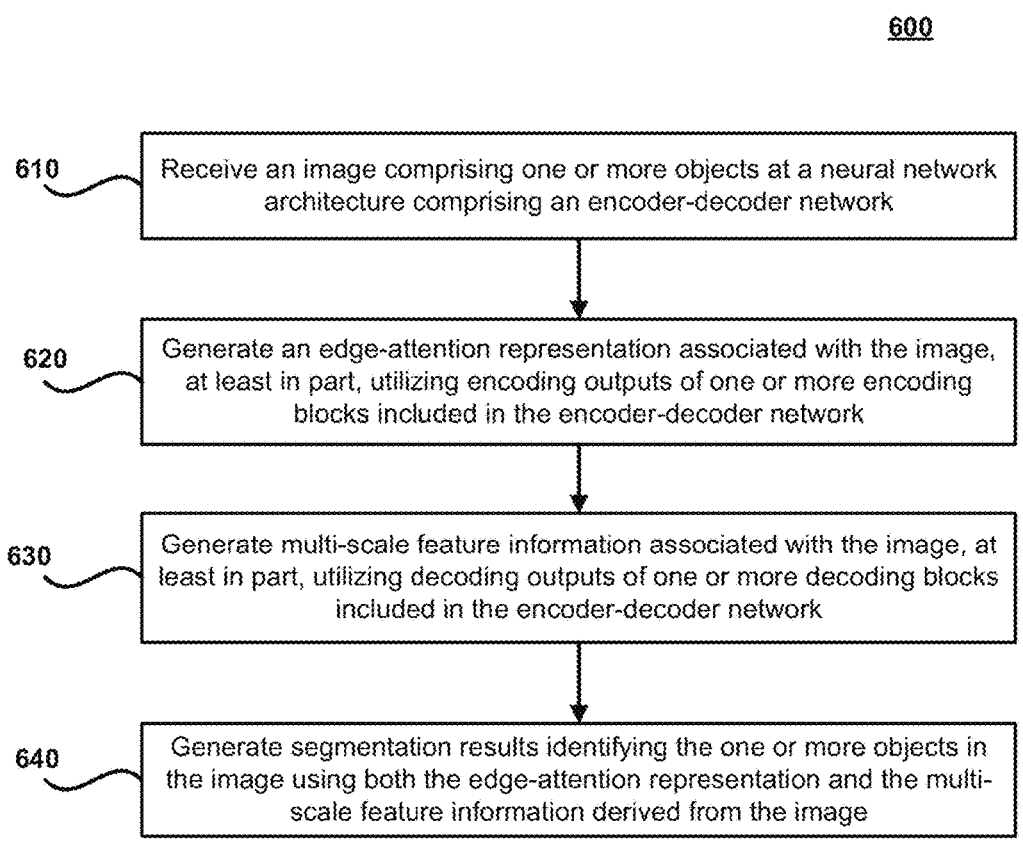
FIG. 6 is a flow chart of an exemplary method according to certain embodiments.

FIG. 6 illustrates a flow chart for an exemplary method 600 according to certain embodiments. Method 600 is merely exemplary and is not limited to the embodiments presented herein. Method 600 can be employed in many different embodiments or examples not specifically depicted or described herein. In some embodiments, the steps of method 600 can be performed in the order presented. In other embodiments, the steps of method 600 can be performed in any suitable order. In still other embodiments, one or more of the steps of method 600 can be combined or skipped. In many embodiments, computer vision system 150, neural network architecture 140, and/or architecture 300 can be suitable to perform method 600 and/or one or more of the steps of method 600. In these or other embodiments, one or more of the steps of method 600 can be implemented as one or more computer instructions configured to run on one or more processing modules (e.g., processor 202) and configured to be stored at one or more non-transitory memory storage modules (e.g., storage device 201). Such non-transitory memory storage modules can be part of a computer system, such as computer vision system 150, neural network architecture 140, and/or architecture 300.

At step 610, an image 130 comprising one or more objects 135 is received at a neural network architecture 140 including an encoder-decoder network 230. The image 130 may represent a 2D or 3D image. In certain embodiments, the image 130 may represent a medical image and the one or more objects 135 may correspond to one or more medical objects, or the image 130 may represent a non-medical image that comprises other types of objects of interest. The encoder-decoder network 230 may include an encoder 310 that is based on ResNet-50 and/or another pre-trained neural network. The encoder 310 may include one more encoding blocks 311 (e.g., encoding blocks 311A-311D in FIG. 3). The encoder-decoder network 230 may also include a decoder 320 that is based on U-Net and/or another pre-trained neural network. The decoder may include one or more decoding blocks 321 (e.g., decoding blocks 321A-C in FIG. 3).

At step 620, an edge-attention representation 245 associated with the image 130 is generated, at least in part, utilizing encoding outputs of one or more encoding blocks 311 included in the encoder-decoder network 230. The edge-attention representation 245 may be generated by the edge guidance module 240 described herein. In certain embodiments, it may be preferable to utilize encoding outputs from early encoding blocks (e.g., encoding blocks 311A and 312B, which perform feature extraction operations before passing data to encoding blocks 311C and 311D) to generate the edge-attention representation 245 because the edge detail information associated with the image 130 is still largely preserved. The edge-attention representation 245 can include low-level or highly localized edge information corresponding to the image 130 in comparison to object-level feature information 235 that can be derived using object segmentation methods. This low-level or highly localized edge information can be useful for identifying boundaries of the one or more objects 135 included in the image 130.

At step 630, multi-scale feature information 255 associated with the image 130 is generated, at least in part, utilizing decoding outputs of one or more decoding blocks 321 included in the encoder-decoder network 230. The multi-scale feature information 255 may be generated by the weighted aggregated module 250 described herein using the outputs of the decoding blocks 321. The weighted aggregated module 250 may include weighted blocks 330 that generate weights that are utilized to identify relevant object-level features in each of the decoding outputs, and to enhance the representation ability of the objects 135. The multi-scale feature information 255 can comprise object-level feature information 235 for each of a plurality of resolutions or image sizes. The multi-scale feature information 255 can preserve the homogeneity and semantic characteristics of objects 135 included in the image 130.

At step 640, segmentation results 160 identifying the one or more objects 135 in the image 130 are generated using both the edge-attention representations 245 and the multi-scale feature information 255 derived from the image 130. In certain embodiments, the weighted aggregation module 250 can generate the segmentation results 160 by combining the edge-attention representation 245 for the image 130 with the multi-scale feature information 255 for the image 130. In certain embodiments, the weighted aggregation module 250 combines the edge-attention representation 245 and the multi-scale feature information 255 by applying a concat-enation function, and then a convolutional layer (e.g., 1×1 convolutional layer) can be applied to the output of the concatenation function to extract and/or segment the one or more objects 135 in the image 130. In this manner, highly accurate segmentation results 160 can be derived by refining global-level or object-level information that is obtained using object detection methods with low-level, localized edge information (e.g., which is useful for obtaining high accuracy in boundary segmentation) that is obtained using edge detection methods of the edge guidance module 240.

While various novel features of the invention have been shown, described and pointed out as applied to particular embodiments thereof, it should be understood that various omissions, substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

What is claimed is:

1. A system for performing image segmentation on one or more images, comprising:
   one or more computing devices comprising one or more processors and one or more non-transitory storage devices for storing instructions, wherein execution of the instructions by the one or more processors causes the one or more computing devices to:
   receive an image comprising one or more objects at a neural network architecture comprising an encoder-decoder network, wherein the encoder-decoder network includes a plurality of encoding blocks and a plurality of decoding blocks;
   generate, using the neural network architecture, an edge-attention representation associated with the image, at least in part, utilizing encoding outputs of one or more encoding blocks included in the encoder-decoder network, wherein the edge-attention representation preserves local edge information included in the image;
   generate, using the neural network architecture, multi-scale feature information associated with the image, at least in part, utilizing decoding outputs of one or more decoding blocks included in the encoder-decoder network, wherein the multi-scale feature information preserves object-level features included in the image;
   generate, using the neural network architecture, segmentation results corresponding to the image using both the edge-attention representation and the multi-scale feature information derived from the image, wherein the segmentation results identify boundaries of the one or more objects in the image.

2. The system of claim 1, wherein generating the segmentation results using both the edge-attention representation and the multi-scale feature information includes:
concatenating the edge-attention representation with the multi-scale feature information; and
utilizing a convolutional layer to extract the one or more objects included in the image.

3. The system of claim 1, wherein generating the multi-scale feature information includes:
generating, at each of the plurality of decoding blocks, the decoding outputs;
providing the decoding outputs to weighted blocks that apply weights to identify relevant object-level features; and
aggregating outputs from the weighted blocks to generate the multi-scale feature information.

4. The system of claim 1, wherein generating the edge-attention representation includes:
generating, using a first encoding block of the encoder-decoder network, a first encoding output having a first resolution;
generating, using a second encoding block of the encoder-decoder network, a second encoding output having a second resolution;
upsampling the second encoding output to the first resolution;
applying one or more convolutional functions to both the first encoding output and the upsampled second encoding output; and
after applying the one or more convolutional functions, generating the edge-attention representation by concatenating the first encoding output and the upsampled second encoding output.

5. The system of claim 1, wherein the neural network architecture is trained, at least in part, using a segmentation loss function that is utilized to optimize generation of the edge-attention representation and the multi-scale feature information.

6. The system of claim 5, wherein the loss function utilizes a separate Lovász-Softmax loss to optimize generation of the edge-attention representation and the multi-scale feature information.

7. The system of claim 5, wherein the neural network architecture is trained using a set of training images that are annotated with pixel-level labels identifying boundaries of objects included in the training images.

8. The system of claim 1, wherein:
the image is a medical image that includes one or more medical objects;
the one or more medical objects include at least one of: an optic disk, an optic cup, an eye vessel, or a lung; and
the segmentation results identify the boundaries of the one or more medical objects with pixel-level accuracy.

9. The system of claim 1, wherein:
the encoder-decoder network comprises four encoding blocks and three decoding blocks;
the encoding outputs from a first and second encoding block are utilized to generate the edge-attention representation;
the decoding outputs from each of the three decoding blocks are utilized to generate the multi-scale feature information.

10. The system of claim 1, wherein:
the system comprises a network;
the image is transmitted to the neural network architecture over the network;
the segmentation results generated by the neural network architecture are transmitted to at least one computing device over the network.

11. A method for performing image segmentation on one or more images, comprising:
receiving an image comprising one or more objects at a neural network architecture comprising an encoder-decoder network, wherein the encoder-decoder network includes a plurality of encoding blocks and a plurality of decoding blocks;
generating, using the neural network architecture, an edge-attention representation associated with the image, at least in part, utilizing encoding outputs of one or more encoding blocks included in the encoder-decoder network, wherein the edge-attention representation preserves local edge information included in the image;
generating, using the neural network architecture, multi-scale feature information associated with the image, at least in part, utilizing decoding outputs of one or more decoding blocks included in the encoder-decoder network, wherein the multi-scale feature information preserves object-level features included in the image;
generating, using the neural network architecture, segmentation results corresponding to the image using both the edge-attention representation and the multi-scale feature information derived from the image, wherein the segmentation results identify boundaries of the one or more objects in the image.

12. The method of claim 11, wherein generating the segmentation results using both the edge-attention representation and the multi-scale feature information includes:
concatenating the edge-attention representation with the multi-scale feature information; and
utilizing a convolutional layer to extract the one or more objects included in the image.

13. The method of claim 11, wherein generating the multi-scale feature information includes:
generating, at each of the plurality of decoding blocks, the decoding outputs;
providing the decoding outputs to weighted blocks that apply weights to identify relevant object-level features; and
aggregating outputs from the weighted blocks to generate the multi-scale feature information.

14. The method of claim 11, wherein generating the edge-attention representation includes:
generating, using a first encoding block of the encoder-decoder network, a first encoding output having a first resolution;
generating, using a second encoding block of the encoder-decoder network, a second encoding output having a second resolution;
upsampling the second encoding output to the first resolution;
applying one or more convolutional functions to both the first encoding output and the upsampled second encoding output; and
after applying the one or more convolutional functions, generating the edge-attention representation by concatenating the first encoding output and the upsampled second encoding output.

15. The method of claim 11, wherein the neural network architecture is trained, at least in part, using a segmentation loss function that is utilized to optimize generation of the edge-attention representation and the multi-scale feature information.

16. The method of claim 15, wherein the loss function utilizes a separate Lovász-Softmax loss to optimize generation of the edge-attention representation and the multi-scale feature information.

17. The method of claim 15, wherein the neural network architecture is trained using a set of training images that are annotated with pixel-level labels identifying boundaries of objects included in the training images.

18. The method of claim 11, wherein:
the image is a medical image that includes one or more medical objects;
the one or more medical objects include at least one of: an optic disk, an optic cup, an eye vessel, or a lung; and
the segmentation results identify the boundaries of the one or more medical objects with pixel-level accuracy.

19. The method of claim 11, wherein:
the encoder-decoder network comprises four encoding blocks and three decoding blocks;
the encoding outputs from a first and second encoding block are utilized to generate the edge-attention representation;
the decoding outputs from each of the three decoding blocks are utilized to generate the multi-scale feature information.

20. A computer program product comprising a non-transitory computer-readable medium, including instructions for causing a computer to:
receive an image comprising one or more objects at a neural network architecture comprising an encoder-decoder network, wherein the encoder-decoder network includes a plurality of encoding blocks and a plurality of decoding blocks;
generate, using the neural network architecture, an edge-attention representation associated with the image, at least in part, utilizing encoding outputs of one or more encoding blocks included in the encoder-decoder network, wherein the edge-attention representation preserves local edge information included in the image;
generate, using the neural network architecture, multi-scale feature information associated with the image, at least in part, utilizing decoding outputs of one or more decoding blocks included in the encoder-decoder network, wherein the multi-scale feature information preserves object-level features included in the image;
generate, using the neural network architecture, segmentation results corresponding to the image using both the edge-attention representation and the multi-scale feature information derived from the image, wherein the segmentation results identify boundaries of the one or more objects in the image.

* * * * *